April 3, 1945.    K. J. CHALLIS    2,372,935
PHOTOGRAPHIC COATING LAYERS
Filed June 23, 1942

Fig. 1
Gelatino-Silver Halide Emulsion Layer
Transparent Support
Antihalation Material Dispersed in Yellow Gum Accroides Fraction Soluble in Sodium Carbonate Fig. 2
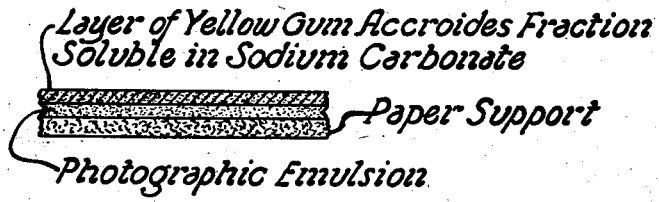
Layer of Yellow Gum Accroides Fraction Soluble in Sodium Carbonate
Paper Support
Photographic Emulsion Kenneth John Challis  INVENTOR.

BY
Lynn B. Morris
ATTORNEY

Patented Apr. 3, 1945

2,372,935

UNITED STATES PATENT OFFICE 2,372,935

PHOTOGRAPHIC COATING LAYER

Kenneth John Challis, Ilford, England, assignor to Ilford Limited, Ilford, England, a company of Great Britain Application June 23, 1942, Serial No. 448,174
In Great Britain June 25, 1941

5 Claims. (Cl. 95—8)

This invention relates to photographic materials carrying layers which serve as anti-halation, filter, protective or stripping layers, and particularly to gelatino-silver halide light-sensitive materials coated on paper, film and glass supports and carrying such layers.

Yellow Gum Accroides, which is also known as Acaroid Balsam, Acaroid Resin, Resina Acaroides and Resin of Botany Bay, is easily soluble in certain organic solvents, such as ethyl and methyl alcohol, a certain amount of insoluble residue, consisting in the main of sand and other naturally occurring matter, being left. The filtered solution may be used to form coatings on photographic film base and on glass. Thus, a solution of Yellow Gum Accroides in ethyl alcohol containing an anti-halation dye may readily be coated on that surface of a photographic film or plate remote from the light-sensitive emulsion to form an anti-halation layer which is soluble in the usual mildly alkaline developing agents.

However, anti-halation layers produced in this way present the disadvantage that if they are kept for a few days, or subjected to heat, their solubility in the mild alkali met with in normal developers becomes considerably less and they may even become completely insoluble in a normal alkaline developer after a few days keeping.

It has now been discovered, however, that a fraction of Yellow Gum Accroides which is soluble in sodium carbonate may be obtained by suitable treatment of the crude material and that this fraction forms an excellent medium for protective coatings, anti-halation coatings and similar coatings for photographic material.

According to the present invention, therefore, photographic elements comprise anti-halation, filter, protective or stripping layers having a basis of a fraction of Yellow Gum Accroides soluble in aqueous sodium carbonate solution. The desired fraction may be isolated by direct extraction of the resin with aqueous sodium carbonate solution but is preferably prepared by dissolving crude Yellow Gum Accroides in an aqueous solution of a strong alkali, e. g. sodium hydroxide, acidifying the resulting solution, extracting the resultant precipitate with a solution of sodium carbonate and acidifying the sodium carbonate extract, whereby the desired fraction is precipitated.

The preferred method of obtaining the desired fraction of Yellow Gum Accroides in which the gum is first treated with a strong alkali leads to an increased yield of the sodium-carbonate soluble fraction. It is conceivable that the strong alkali may effect some saponification of the resin, leading to the production of a greater quantity of sodium-carbonate-soluble constituents, and the expression "sodium-carbonate-soluble fraction" is therefore to be understood as including all the materials which can be so extracted, even though some part of the extract may not have been present in the original gum as a sodium-carbonate-soluble constituent.

The resinous material obtained as indicated above readily forms a continuous film when dissolved in alcohol or other suitable solvent, cast as a layer and dried, and such layers do not deleteriously affect silver halide emulsion layers when brought into surface contact with them. Moreover, such layers adhere well to paper, to cellulose acetate and cellulose nitrate films, to glass and to gelatine layers and they are readily dissolved or dispersed in the normal alkaline photographic developing solutions. It is an additional advantage of these layers that they do not readily become tacky or show markings when touched by moist hands and that dyed layers according to this invention may be handled without staining the hands.

The sodium-carbonate-soluble fraction of Yellow Gum Accroides employed according to the present invention is of especial value as a medium for an anti-halation dye or pigment. The anti-halation dye or pigment selected in any particular case must be one which is absorptive of light of wave lengths to which the photographic emulsion is sensitive. The invention may be applied, for example, to elements coated with light-sensitive panchromatic emulsions in which case a green or black dye is suitable, or with orthochromatic and non-colour sensitised emulsions in which cases red and yellow dyes are respectively suitable.

Naturally occurring pigments may be employed in accordance with this invention since the whole anti-halation layer is removed during the processing of the photographic element. However, it is preferable to employ organic dyestuffs and particularly dyes which bleach out in the normal photographic developing solutions, e. g. dyes of the triphenyl-methane class such as benzaurin (Schultz, Farbstoff Tabellen, No. 837), Acid Green G (Colour Index No. 666) Acid Magenta (Colour Index No. 692) and Lissamine Green S. F. (Colour Index No. 670 of Supplement). Mixtures of dyes or pigments may be employed if desired.

In addition to its use as a medium for anti-halation layers, the sodium-carbonate-soluble fraction of Yellow Gum Accroides may be employed as a medium for a dyestuff to form a filter layer, e. g. in multi-layer material for use in colour photography, and may also be used to form a protective coating on photographic emulsions, e. g. to protect the emulsion surface from stress marks. Moreover, in view of the solubility of the fraction in dilute sodium carbonate solution it may be used as a photographic stripping layer, stripping being effected by treatment with dilute sodium carbonate solution.

In the production of the coating layers according to this invention a convenient method is to form a solution of the sodium-carbonate-soluble fraction of Yellow Gum Accroides in a suitable solvent, e. g. ethyl alcohol, adding to this the anti-halation dye or pigment if required and coating the solution as a layer on the photographic element, drying the layer by evaporation of the solvent.

The sodium-carbonate-soluble fraction of Yellow Gum Accroides may be employed in combination with other resinous substances to form the various photographic layers according to the invention. In particular it may very usefully be employed in conjunction with the mixed resin acids derived from tall oil described in U. S. Patent No. 2,287,807, and the latter may form, for example, 20–80% of the total resinous material of the layer.

Any other of the usual additions to resin coatings may be employed in conjunction with the resin coatings of this invention, e. g. high boiling solvents, plasticisers and the like.

The following examples illustrate the invention:

*Example 1*

This example illustrates the production of a sodium-carbonate-soluble fraction of Yellow Gum Accroides employed according to the present invention.

9 parts by weight of crude Yellow Gum Accroides was boiled for 2½ hours in 100 parts of 10% sodium hydroxide solution in water. The resulting solution was allowed to stand for 1½ hours and filtered. The filtrate was acidified by adding a sufficiency of dilute hydrochloric acid. The resulting dispersion of precipitated resin was heated to produce a melt of the resin, and this was cooled, separated, ground, washed and dried. The resin thus obtained was allowed to stand overnight in 100 parts of a cold 3% aqueous solution of sodium carbonate ($Na_2CO_3$). The resulting solution was filtered and acidified with the necessary quantity of dilute hydrochloric acid. The desired sodium-carbonate-soluble fraction was precipitated and this was removed by filtration, washed and dried. If desired, a further purification may be effected by re-dissolving the fraction in sodium carbonate, filtering and re-precipitating with hydrochloric acid.

*Example 2*

This example illustrates the use of the sodium-carbonate-soluble fraction of Yellow Gum Accroides as the medium for an anti-halation layer.

A solution of 5 gms. of Acid Green G in a mixture of 70 ccs. of ethyl alcohol (74° O. P.) and 5 ccs. of ethylene glycol mono-ethyl ether was prepared and filtered free from any undissolved particles of dye. 5 gms. of the sodium-carbonate-soluble fraction of Yellow Gum Accroides produced according to Example 1 was slowly added to the above solution. When the resin had dissolved, the solution was again filtered and coated on one side of a photographic plate bearing on the opposite side a gelatino-silver halide light-sensitive emulsion. The coating was allowed to dry and yielded a smooth hard layer such that only a trace of stain was imparted to a moistened finger when rubbed over the dried coating. The resulting plate is illustrated in Fig. 1 of the drawing. The photographic plate, after exposure, was developed in a standard metol-hydroquinone developer whereupon the anti-halation coating was immediately dissolved. It was found that even after five weeks keeping at 120° F. the coatings prepared according to this example were still readily soluble in standard alkaline developers. Moreover, keeping tests showed no sign of any deleterious effect on the silver halide emulsion caused by the anti-halation layer.

*Example 3*

This example illustrates the use of the sodium-carbonate-soluble derivative of Yellow Gum Accroides as an emulsion supercoat. The emulsion surface of paper carrying a non-colour-sensitised photographic emulsion was coated with a filtered solution of one part by weight of the sodium-carbonate-soluble fraction of Yellow Gum Accroides produced according to Example 1 in a mixture of 16 parts by weight of ethyl alcohol (74° O. P.) and 2 parts by weight of ethylene glycol mono-ethyl ether. The coating was allowed to dry and yielded a smooth hard layer which was rapidly dissolved on immersion in a normal alkaline photographic developer. The resulting photographic element is illustrated in Fig. 2 of the drawing.

*Example 4*

This example illustrates the use of the sodium-carbonate-soluble fraction of Yellow Gum Accroides in combination with another resinous substance in the formation of an anti-halation layer:

A solution was prepared consisting of:

| | |
|---|---|
| Ethyl alcohol (74° O. P.) cubic centimeters | 560 |
| Ethylene glycol monoethyl ether do | 40 |
| Sodium-carbonate-soluble fraction of Yellow Gum Accroides (prepared as in Example 1) grams | 8 |
| Mixed resin acids of tall oil do | 32 |
| Acid Green G do | 40 |

This was coated on a photographic plate as in Example 2 and yielded a very satisfactory anti-halation layer.

What I claim is:

1. A photographic element which comprises a transparent support, a coating of a light-sensitive silver halide on one face of the support and an anti-halation layer on the other face of the support, the said anti-halation layer comprising a continuous film of a fraction of Yellow Gum Accroides which is soluble in aqueous sodium carbonate solution and, dispersed throughout said film, a colouring matter which is absorptive of light of wave-lengths to which the said light-sensitive halide is sensitive.

2. A photographic element according to claim 2 wherein the colouring matter is a dyestuff of the tri-phenyl methane class which is destroyed by alkaline photographic developer solutions.

3. A photographic element according to claim 2 wherein the anti-halation layer comprises, in addition to the said fraction of Yellow Gum Accroides, a substantial proportion of the mixed resin acids of tall oil.

4. A photographic element which comprises a support, a coating of a light sensitive silver halide, and superposed on the outer surface of said light sensitive halide, a continuous film of a fraction of Yellow Gum Accroides which is soluble in aqueous sodium carbonate solution.

5. A photographic element which comprises a support, at least one light-sensitive layer, and at least one layer which comprises a fraction of Yellow Gum Accroides which is soluble in aqueous sodium carbonate solution.

KENNETH JOHN CHALLIS.